A. TEITEL.
FILM CLEANING APPARATUS.
APPLICATION FILED APR. 6, 1920.
1,401,014.
Patented Dec. 20, 1921.
3 SHEETS—SHEET 1.
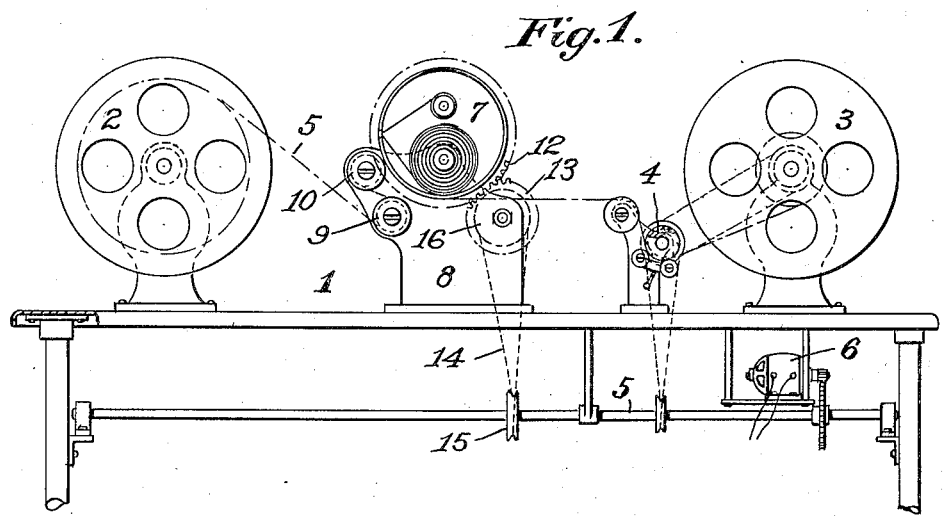
Fig. 1.
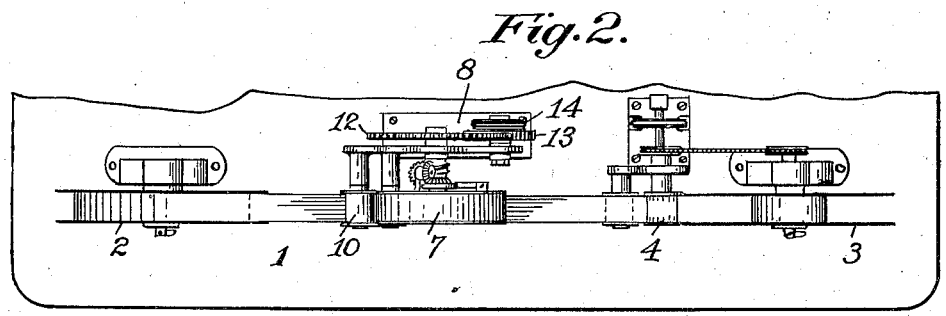
Fig. 2.
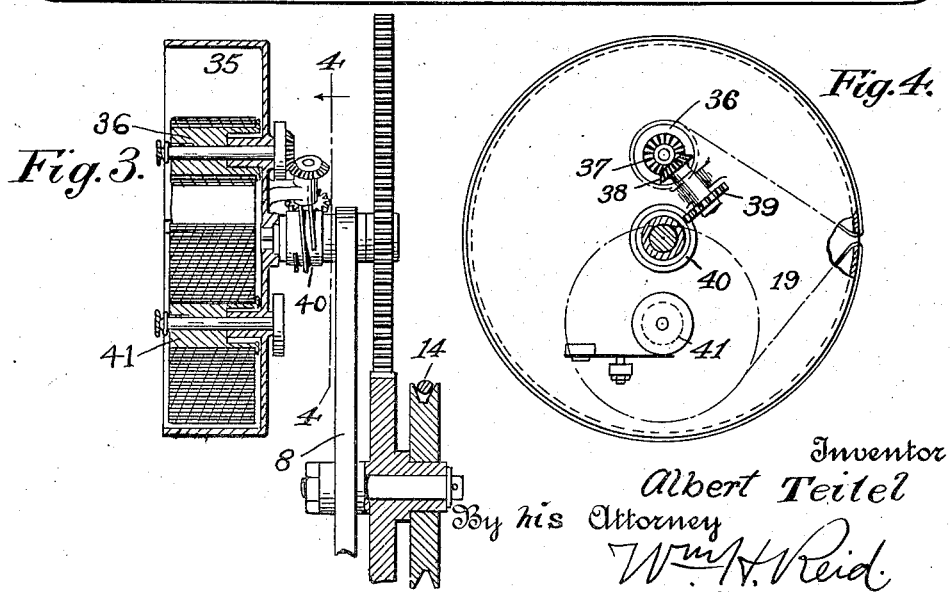
Fig. 3.
Fig. 4.
Inventor
Albert Teitel
By his Attorney
Wm. H. Reid A. TEITEL.
FILM CLEANING APPARATUS.
APPLICATION FILED APR. 6, 1920.
1,401,014.
Patented Dec. 20, 1921.
3 SHEETS—SHEET 3.
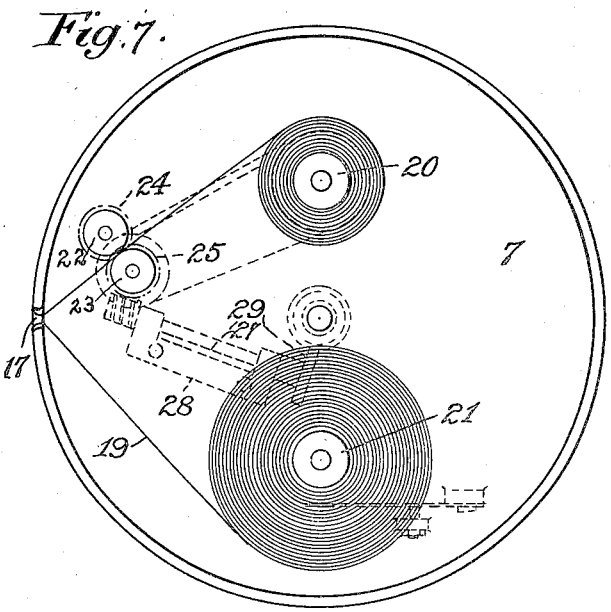
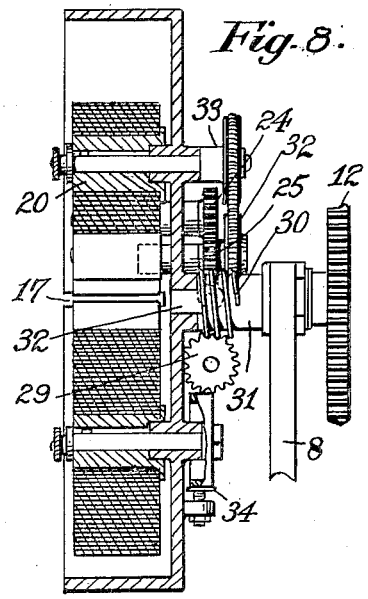
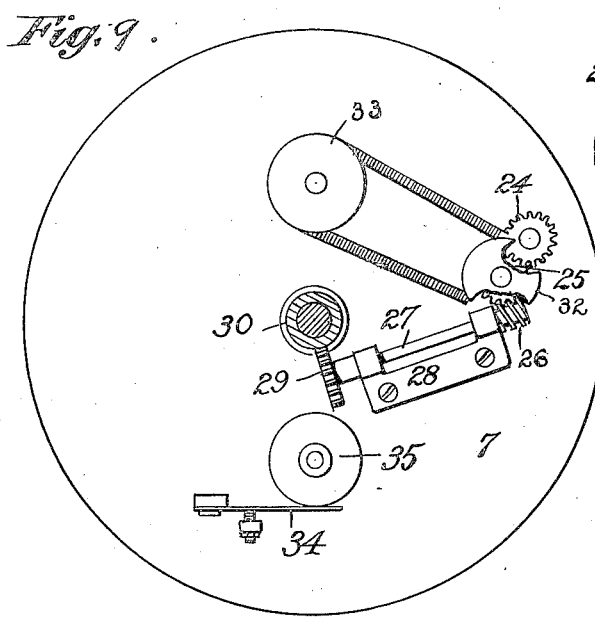
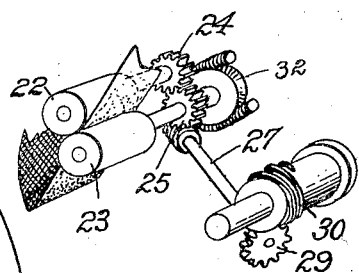
Inventor
Albert Teitel
By his Attorney
Wm H. Reid

UNITED STATES PATENT OFFICE.

ALBERT TEITEL, OF NEW YORK, N. Y., ASSIGNOR TO CINEMA PATENTS COMPANY, OF CHICAGO, ILLINOIS, A PARTNERSHIP.

FILM-CLEANING APPARATUS.

1,401,014.   Specification of Letters Patent.   Patented Dec. 20, 1921.

Application filed April 6, 1920. Serial No. 371,603.

*To all whom it may concern:*

Be it known that I, ALBERT TEITEL, a citizen of the United States, and resident of New York, in the county of Bronx and State of New York, have invented certain new and useful Improvements in Film-Cleaning Apparatus, of which the following is a specification.

This application is a continuation in part of my previous application Ser. No. 326,829, filed September 27, 1919; the structure shown in Figures 9 and 10 of the present application being identical with the structure shown in Figs. 13, 14 and 17 of said previous application.

This invention has reference to apparatus for cleaning a flexible web of considerable length of any material, particularly the films of suitable flexible photographic material employed with motion picture machines, usually made of celluloid or paper.

The object of the present invention is to provide a form of apparatus that will automatically remove from the film, material of various forms that accumulates in the use of the film for projecting purposes or in the developing process, during the continuous and rapid passing of the film through the apparatus, yet will have no injurious action whatever upon the film, but restore it to its original condition.

A further object of the invention is to provide means in the nature of a circular member that is rotated in contact with the moving film, and which is arranged to have a cleaning web located on its periphery to engage the film, and which web of considerable length is carried by the revolving member, and automatically caused to have a renewed portion presented at the said periphery during the rotation of the member and while engaging the film; whereby a constantly renewed cleaning surface is presented to the moving film.

In the accompanying drawings illustrating embodiments of my invention, Fig. 1 shows the complete apparatus, with one form of annular member.

Fig. 2 is a plan view, showing annular member of Figs. 3 and 4.

Fig. 3 shows enlarged a partial vertical section of a cleaning drum.

Fig. 4 is a section taken on the line 4—4 of Fig. 3.

Fig. 7 is a side elevation of another modified form of driving means for the cleaning drum web.

Fig. 8 is a transverse cross section of the modification shown in Fig. 7.

Fig. 9 is a side elevation from the side opposite to that shown in Fig. 7, and

Fig. 10 is a detail perspective of the means for driving the feeding rolls shown in Figs. 7, 8 and 9.

Figure 5:
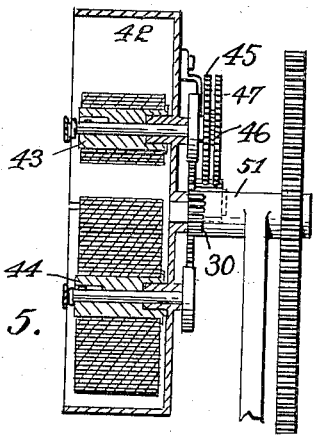
Fig. 5 is a transverse cross section of a cleaning drum showing a modified form of a driving means for advancing the cleaning web.

The present invention relates particularly to a cleaning drum in the nature of a buff wheel, and which drum is caused to rotate, and the film is advanced in engagement with the periphery of the drum at a considerable speed, and preferably the contacting portions of the drum and film travel in opposite directions. The drum has its periphery covered with a cleaning web, which web is of considerable length and is carried by the drum, and such web is caused to constantly present a renewed portion on the drum periphery to engage the film. The web is preferably carried by two reels on the drum, and the web is passed around the drum with one end connected with each reel, and the web is wound up on one reel, and unwound from the other reel as it is caused to travel around the periphery of the drum. Several means for effecting such movement of the web around the drum, are disclosed herein, all of which means are automatically actuated by and during the rotation of the drum.

Referring first particularly to the arrangement of the drum set forth in Figs. 7–10, also in Fig. 1, it will be seen that I provide a table 1 provided with a supply reel 2 rotatably mounted, also a rotatable take-up reel 3, and a feed device denoted generally by 4. The film 5 is drawn from the supply reel 2 by the feed device 4, and wound up on the reel 3. Such mechanism is common in this art and need not be further described. The device 4 may be driven from a power shaft 5 on the table actuated by a motor 6. In Fig. 1 is shown a drum 7 rotatably mounted on a standard 8, and guide rolls 9 and 10 cause the film to travel against the lower portion of the drum 7 as the film passes to the feed device 4. The drum shaft 11 carries a gear 12 engaging a drive gear 13, that is suitably driven from the main shaft 5, as by a belt 14 and pulleys 15 and 16.

As set forth in Figs. 7–12, the drum 7 has a slot 17 in the flange or periphery 18, and a cleaning web 19 of considerable length is carried by reels 20 and 21, means are provided for rotating the reel 20, and the web wound on this reel will be drawn in through the slot 17 and pulled around the periphery of the drum; hence it will be drawn off of the supply reel 21. When the latter reel is exhausted of the web and the other reel is filled, the two reels can be interchanged and the same web caused to operate as before.

In this particular arrangement the reel 20 does not cause movement of the web, but I provide a pair of feed rolls 22 and 23, geared together by gears 24 and 25. The roll 23 has its gear 25 acting as a worm wheel for engagement with a worm 26 carried by a spindle 27. The latter is mounted in a bearing block 28 on the drum 7. The spindle 27 also carries a gear in the nature of a worm wheel 29 that constantly engages a fixed worm 30 fast on the bearing portion 31 for the shaft 32 of the drum 7, see Fig. 8. As the block 28 is fast to the drum 7, it will be carried around by the rotation of the drum, and the worm 30 being concentric with the drum constantly engages the worm wheel 29 and serves to impart a slow rotation to this worm and spindle. If the fixed worm has a single pitch the worm wheel 29 will advance one tooth only for each rotation of the drum. And the spindle 27 will cause its worm 26 to advance the worm wheel or gear 25 by a very slow movement. Thereby the feed rolls 23 and 22 are turned at a very slow speed compared with the rotation of the drum, because of this double reduction by the two worms.

The reel 20 in this arrangement acts as a take-up, being rotated by a slip belt 31 from pulley 32 fast to the drum 25, that engages a pulley 33 fast to the reel 20. A brake arm 34 engages a disk 35 fast to the reel 21 to prevent the film unwinding faster than needed. It will be seen from this construction that the rotation of the drum 7 will automatically cause the web 19 to be wound on the take-up reel 20, by the feed rolls 22, 23 at a comparatively slow speed, and the web will be unwound from the supply reel 21. Thus the web will be constantly renewed during the operation of the drum.

In Figs. 2–4 a similar arrangement is set forth, but only a single worm reduction is shown. In this arrangement the drum 35 carries a feed reel 36 driven by miter gears 37, 38, and a worm wheel 39 fast to the latter, that engages a fixed worm 40 on the shaft of the drum 35. The operation of this arrangement is very similar to that just described. The web 19 is unwound from a reel 41 on the drum 35.

Figure 6:
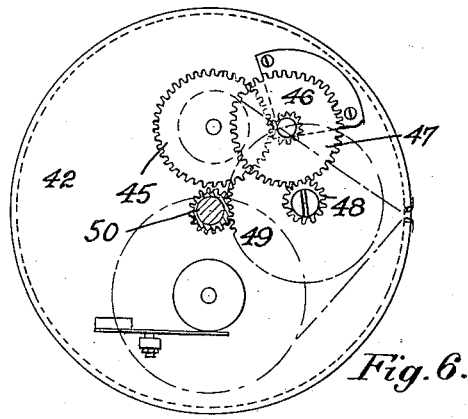
Fig. 6 is a side elevation of the modification shown in Fig. 5.

In Figs. 5 and 6 I show a drum 42 carrying a feed reel 44, in which the feed reel is operated by plain gears. The reel 43 carries a gear 45 engaging a pinion 46, and the latter carries a gear 47 engaging a pinion 48. A gear 49 fast to the pinion 48, and carried by the drum, engages a fixed gear 50 that is carried by the bearing portion 51, and concentric with the drum 42. The rotation of the drum will cause all of these gears movably carried by the drum to be turned, and the three reductions of the gears will result in a comparatively slow speed of the feed reel 43.

What I claim is:

1. In a film cleaning machine, a rotatable drum having a slot in its periphery, a pair of rolls carried by the drum arranged to have a cleaning web wound from one roll to the other and which web can pass out through said slot and around the periphery of the drum and back through the slot to the other roll, means for rotating one of said rolls from the rotation of the drum, comprising a fixed worm concentric with the drum, a worm wheel carried by the drum and engaging said worm whereby the worm wheel is turned by the worm on rotation of the drum, and means connecting the worm wheel with one of said rolls to rotate the roll.

2. In a film cleaning machine, a rotatable drum having a slot in its periphery, a pair of rolls carried by the drum arranged to have a cleaning web wound from one roll to the other and which web can pass out through said slot and around the periphery of the drum and back through the slot to the other roll, means for rotating one of said rolls from the rotation of the drum, comprising a fixed worm concentric with the drum, a worm wheel carried by the drum and engaging said worm whereby the worm wheel is turned by the worm on rotation of the drum, and miter gears connecting the worm wheel with one of said rolls to turn the roll.

3. In a film cleaning machine, a rotatable drum arranged to support a cleaning web on its periphery, and means arranged to move the web around the periphery of the drum for continuously renewed engagement with the film, and which web movement is automatically effected by the rotation of the drum, said means including a fixed worm concentric with the drum, and a worm wheel carried around with the drum and engaging the worm to be turned thereby and advance the web around the drum.

4. In a film cleaning machine, a rotatable drum having a slot in its periphery, a pair of reels carried by the drum arranged to have a cleaning web wound from one reel to the other and which web can pass out said slot and around the periphery of the drum and back from the slot to the other reel, a pair of feed rolls carried by the drum, and means for causing rotation of said feed rolls by the rotation of the drum, to move the web around the drum periphery for renewed engagement with the film.

5. In a film cleaning machine, a rotatable drum having a slot in its periphery, a pair of reels carried by the drum arranged to have a cleaning web wound from one reel to the other and which web can pass out said slot and around the periphery of the drum and back from the slot to the other reel, a pair of feed rolls carried by the drum, and means for causing rotation of said feed rolls by rotation of the drum, to move the web around the drum periphery for renewed engagement with the film, said means including a fixed worm concentric with the drum, and a worm wheel carried around with the drum and engaging the worm to be turned thereby and advance the web around the drum.

6. In a film cleaning machine, a rotatable drum having a slot in its periphery, a pair of reels carried by the drum arranged to have a cleaning web wound from one reel to the other and which web can pass out said slot and around the periphery of the drum and back through the slot to the other reel, a pair of feed rolls carried by the drum arranged to advance the web around the drum, a slip belt connecting the rolls and one reel to wind up the web as advanced by the rolls, a spindle carried by the drum, a worm on said spindle, a gear on one of said rolls engaged by said worm, a gear on said spindle, and a fixed worm concentric with the drum that engages said spindle gear, whereby the revolution of the drum will cause rotation of the said spindle and thereby of the feed rolls and said reel.

Signed at New York city, N. Y., on March 30th, 1920.

ALBERT TEITEL.